(12) United States Patent
Zhang et al.

(10) Patent No.: US 11,410,540 B2
(45) Date of Patent: Aug. 9, 2022

(54) SYSTEM AND METHOD FOR EVENT PREVENTION AND PREDICTION

(71) Applicant: FUJIFILM Business Innovation Corp., Tokyo (JP)

(72) Inventors: Yanxia Zhang, Cupertino, CA (US); Andreas Girgensohn, Palo Alto, CA (US); Qiong Liu, Cupertino, CA (US); Yulius Tjahjadi, San Mateo, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 371 days.

(21) Appl. No.: 16/698,616

(22) Filed: Nov. 27, 2019

(65) Prior Publication Data

US 2021/0035437 A1    Feb. 4, 2021

Related U.S. Application Data

(60) Provisional application No. 62/881,665, filed on Aug. 1, 2019.

(51) Int. Cl.
| | |
|---|---|
| *G08B 31/00* | (2006.01) |
| *G06K 9/62* | (2022.01) |
| *G08B 29/18* | (2006.01) |
| *G08B 21/04* | (2006.01) |
| *G06V 40/20* | (2022.01) |

(52) U.S. Cl.
CPC .......... *G08B 31/00* (2013.01); *G06K 9/6232* (2013.01); *G06K 9/6257* (2013.01); *G06V 40/23* (2022.01); *G08B 21/043* (2013.01); *G08B 21/0476* (2013.01); *G08B 21/0492* (2013.01); *G08B 29/186* (2013.01)

(58) Field of Classification Search
CPC ..................................................... G08B 31/00
See application file for complete search history.

(56) References Cited

U.S. PATENT DOCUMENTS

| | | | |
|---|---|---|---|
| 2020/0211154 A1* | 7/2020 | Ng | G06V 20/41 |
| 2021/0142643 A1* | 5/2021 | Susna | A61B 5/7264 |

OTHER PUBLICATIONS

Preventing falls in hospitals. https://www.ahrq.gov/professionals/systems/hospital/fallpxtoolkit/fallpxtk3.html. Accessed: Jun. 10, 2019.
Ambrose, A. et al. "Risk factors for falls among older adults: a review of the literature" Maturitas, 2013; pp. 51-61, vol. 75, Issue 1.

(Continued)

*Primary Examiner* — Travis R Hunnings
(74) *Attorney, Agent, or Firm* — Procopio, Cory, Hargreaves & Savitch LLP

(57) ABSTRACT

A computer-implemented method is provided, comprising, based on information of a subject positioned on an object in an environment, generating a data stream; for the data stream, extracting features associated with a movement of the subject with respect to the object or the environment, wherein the movement is represented by spatio-temporal features extracted from sensors; generating a prediction associated with a likelihood of the movement based on the extracted features, and a risk profile of the movement based on a plurality of fall risk factors; and applying the prediction and the risk profile to a rule base to perform an action.

18 Claims, 10 Drawing Sheets
(5 of 10 Drawing Sheet(s) Filed in Color)

(56) References Cited

OTHER PUBLICATIONS

Attenello, F. et al. "Incidence of "never events" among weekend admissions versus weekday admissions to US hospitals: national analysis" BMJ (online), Apr. 2015, 350:h1460, 2015.
Cippitelli, E. et al. "Radar and RGB-Depth Sensors for Fall Detection: A Review" IEEE Sensors Journal, 2017, 17 (12): pp. 3585-3604.
Cuttler, S. et al. "Reducing medical-surgical inpatient falls and injuries with videos, icons and alarms" BMJ Open Quality, 6(2):e000119, 2017 (9 pages).
Dai, Xiaoxiao "Vision-Based 3D Human Motion Analysis for Fall Detection and Bed-Exiting" Electronic Theses and Dissertations 152. 2013 (65 pages).
Feder, G. et al. "Guidelines for the prevention of falls in people over 65" BMJ. Oct. 21, 2000; 321(7267): 1007-1011.
Feil, M. et al. "The Use of Patient Sitters to Reduce Falls: Best Practices" Pennsylvania Patient Safety Advisory, vol. 11, No. 1; Mar. 2014 (8 pages).
Özdemir, A. T. et al. "Detecting Falls with Wearable Sensors Using Machine Learning Techniques" Sensors 2014, 14, 10691-10708; doi:10.3390/s140610691.
Rajagopalan, R. et al. "Fall Prediction and Prevention Systems: Recent Trends, Challenges, and Future Research Directions" Sensors, Nov. 2017, 17(11):2509. (17 pages).
Singh, I. et al. "Risk of inpatient falls is increased with single rooms" BMJ 2013, 1 page.
Veronese, N. et al. "Association Between Short Physical Performance Battery and Falls in Older People: The Progetto Veneto Anziani Study" Rejuvenation Research, Jun. 1, 2014, 17(3); pp. 276-284.
Wang, H. et al. "Action Recognition with Improved Trajectories" CCV—IEEE International Conference on Computer Vision, Dec. 2013, Sydney, Australia, pp. 3551-3558.
Williams, T. et al. "An analysis of patient falls and fall prevention programs across academic medical centers" Journal of Nursing Care Quality: Jan./Mar. 2014—vol. 29—Issue 1—p. 19-29.
Yoshida, S. "A Global Report on Falls Prevention Epidemiology of Falls" Ageing and Life Course Family and Community Health World Health Organization, 2007 (40 pages).
Zhou, J. et al. "The Complexity of Standing Postural Sway Associates with Future Falls in Community-Dwelling Older Adults: The MOBILIZE Boston Study" Scientific reports, 7(1):2924, 2017.

* cited by examiner

_100_

SYSTEM AND METHOD FOR EVENT PREVENTION AND PREDICTION

CROSS REFERENCE TO RELATED APPLICATION

This application claims priority to U.S. Provisional Patent Application No. 62/881,665, filed Aug. 1, 2019, the contents of which are incorporated herein by reference.

FIELD

Aspects of the example implementations relate to methods, systems and user experiences associated with prevention and prediction of an event by a combination of action forecasting, electronic health records and individual event risk profile.

RELATED ART

In the related art, a person may fall from a bed, chair or other object. Such a fall is a significant problem that may cause injury to the person, such as minor bruises, disability or death. In an in-patient or hospital environment, falls and associated injuries are some of the leading conditions that are acquired by patients during their stay in the hospital. It is estimated that there are more than 1 million patients who fall in hospitals annually in the United States, which accounts for 85% of hospital acquired conditions. Further, 29 to 55% of patient falls result in injury, and the cost associated with fall injuries is over $30 billion a year. The related art approaches to fall detection may place significant financial, emotional and legal pressure on medical facilities such as hospitals, as well as their staff.

Related art approaches to address the problem of falling have focused on the event detection approaches, such as use of bed exit alarms or pads on the bed or floor, to trigger alerts after a patient has fallen out of a bed. The related art approaches analyze sensor data to detect falls after they have occurred. However, in addition to the sensor data, there are other multifaceted factors, such as demographics, health conditions and ambient or surrounding conditions that may contribute to a fall.

FIGS. 1(a)-1(c) illustrate various related art approaches. Some related art approaches are pressure based, such that in response to an absence or presence of pressure on the pad, an alarm is triggered. For example, FIG. 1(a) illustrates a pressure sensitive pad 101 positioned below a patient sleeping on a bed, such that when pressure is applied to the pressure sensitive pad 101, an alarm may be triggered. However, this related art approach may have various problems and disadvantages. For example, this related art approach is reactive, and may not be activated sufficiently quickly prior to the patient being out of the bed. For example, but not by way of limitation, the pressure based related art approach may result in frequent false alarms, due to weight differences and non-falling movement of a patient, as well as the issue of improper timing of activation as explained above. Thus, pressure pads may not be accurate to detect a patient getting out of bed.

Alternatively, a patient may manually trigger an alarm upon or after falling. FIG. 1(b) illustrates a bed exit alarm 103 that is positioned on the frame of a bed in which a patient may be sleeping. Other approaches include use of sitters with the patient, or bed restraints that prevent movement of the patient altogether, as shown in FIG. 1(c) as bed restraint 105.

Additionally, in the related art nurses must devote additional resources to patients with a higher fall risk. The assessment of fall risk may be based on related art risk assessment tools, such as the Morse Fall Scale or motor tests. However, this related art approach has various problems and disadvantages. For example, but not by way of limitation, these risk assessments are not reliable, as virtually all patients in the hospital would be rated as having a high fall risk; thus, it is not a useful tool to allocate resources to certain patients with higher fall risk. Further, fall risks may be related not only to mobility, but other factors that are not covered in the related art risk assessment tests. Those other factors may include surrounding environment, medical process, and the like, for example.

Additionally, even if nurses taking related art approaches devote additional resources, the patient may not remember or be able to call for the nurse when intervention is needed. Moreover, because the difficulty of risk assessment presents challenges with respect to planning as to when a patient might need intervention, related art approaches make it difficult to prioritize patient care, and differentiate which patient may need assistance.

Further, some related art approaches may use motion history image sequences as visual features and in a Markov models for activity classification, motion history image requires manually selecting the wanted motion and is sensitive to illumination or slight trembling of the camera, and may miss subtle human posture changes. Such related art approaches only focus on in—bed activity, and does not use context features for analysis of a risk of a fall. The related art approach also applies segmented motion history, instead of the dense trajectory or deep learning approaches described here.

SUMMARY

Aspects of non-limiting example implementations related prevention of falls, and more specifically, to anticipating falls before they happen in order to potentially prevent the falls, instead of only reacting to falls after they have been detected.

According to an aspect of the example implementations, a computer-implemented method is provided for, based on information of a subject positioned on an object in an environment, generating a data stream; for the data stream, extracting features associated with a movement of the subject with respect to the object or the environment, wherein the movement is represented by spatio-temporal features extracted from sensors; generating a prediction associated with a likelihood of the movement based on the extracted features, and a risk profile of the movement based on a plurality of fall risk factors; and applying the prediction and the risk profile to a rule base to perform an action.

Example implementations may also include a non-transitory computer readable medium having a storage and processor, the processor capable of executing instructions for prevention and prediction of an event by action forecasting, electronic health records and individual event risk profile.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
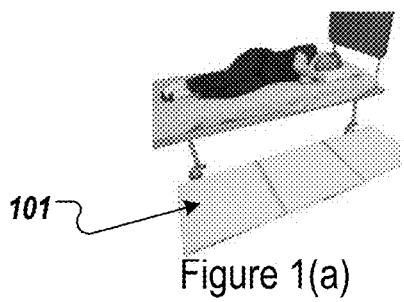
FIGS. 1(a)-1(c) illustrate various related art approaches.
Figure 1B:
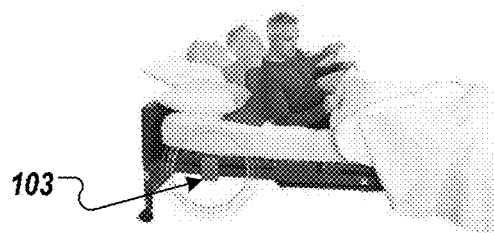
Figure 1C:
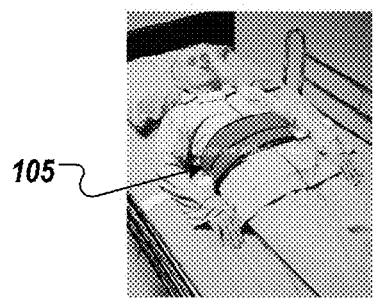

The following detailed description provides further details of the figures and example implementations of the present application. Reference numerals and descriptions of redundant elements between figures are omitted for clarity. Terms used throughout the description are provided as examples and are not intended to be limiting.

Aspects of the example implementations are directed to systems and methods associated with prevention of an event prior to the occurrence of the event. For example, the event may be a movement of a subject (e.g., person) relative to an object (e.g., environment), and more specifically, a fall of a person (e.g., patient) from a bed or a chair, such as a subject in a hospital or a resident of a nursing home, subsequently referred to as the subject or subject. For example, but not by way of limitation, the foregoing example implementations may be applied in a non-hospital setting, such as in a residence of the subject, to address conditions such as sleepwalking or other abnormal movement in sleep. Further, the example implementation may be incorporated with other types of sensors that may predict and assess risk with respect to other types of conditions, such as sleep apnea, sudden infant syndrome (SIDS), or other conditions. In a manner similar to that explained above, with respect to control of a hospital bed, the example implementations may control other medical devices, such as intravenous feed, oxygen supply, breathing support, etc.

A vision based method is provided to predict if a subject is attempting to exit a safe position, based on motion trajectories and deep recurrent neural networks (RNNs). Further, dynamic and subject specific fall risk profiling is provided based on intrinsic and external factors, as explained below. Further, the combination of the predictive model of whether a subject is about to exit a position in a bed combined with the risk profiling is used to generate signaling strategies that are provided for prevention of falls that is customized or tailored based on differing severity of falling in different risk situations.

More specifically, example implementations include systems and methods for fall prevention, such as fall predictive analysis and signals for prevention. Information received from sensors such as video cameras may be used to forecast the risk of injury for a subject, and may continuously estimate the likelihood of a subject moving from a safe position, such as in a bed or a chair.

For example, the sensors may be nonintrusive vision based sensors in a surrounding of the subject that may monitor activities of the subject. Color, grayscale, depth and other aspects of videos may be provided. Further, sensors may be provided to capture passive infrared, microwave, ultrasound or other medium to detect motion of a subject.

Further, it is noted that the sensors do not just sense activity at the immediate location of the subject himself, but also sense the entire environment of the subject, including but not limited to the subject, the safe location of the subject such as in a bed or a chair, and the ambient surroundings of the room in which the subject is located.

This likelihood is dynamic, and may differ from subject to subject. Moreover, the likelihood will generally be lower when a subject is in a safe position, such as lying down in a bed or sitting in a chair, and increases as the subject moves from the safe position and attempts to transition out of the safe position. By anticipating a fall before the fall actually happens, it may be possible to prevent the fall.

The system may continuously update by monitoring risk factors based on information received from health records of subjects, behavior patterns, vital signs and surrounding conditions, for example. A ranking may be provided based on a severity of signaling for providing recommendations as to a signaling strategy to be executed in order to prevent the fall. As a result, instead of detecting a fall after it has occurred, the fall is predicted prior to occurrence.

The example implementations employ a vision based approach that predicts whether a subject is attempting to exit a safe position. Spatio-temporal visual features (e.g., dense trajectories) are used to extract local atomic action patterns from data streams (e.g., image streams) of a moving body. Further, Fisher vectors are used to encode features, and neural networks are used for activity prediction associated with the environment, such as the bed or chair.

Further, the example implementations employ dynamic and subject specific risk profiling, which is associated with a risk of a fall. For example, activity histories, intrinsic factors and external factors may be fused to provide personalized risk analysis associated with a fall. Multiple risk factors associated with a fall may be encoded into variables, and a fall risk may be computed using regression. By using an analysis of the behavioral patterns of a subject, a predictive model may be generated to predict a next action of the subject. For example, but not by way of limitation, if a subject is lying down and suddenly sits up, and likelihood of the subject attempting to move out of the bed can be calculated. Based on this calculation, a signal can be provided to the subject or another entity in a position to attempt to stop the fall before it happens. Thus, a signal that has one of a plurality of levels of likelihood is generated and provided that may be used to prevent or avoid falls.

Additionally, fall prevention signaling strategies are provided according to the example implementations. For example, a severity of intervention may be determined as well as a timing, and how to intervene, by combining a subject's fall risk and a likelihood of the subject exiting a safe position.

Aspects of the example implementation are directed to prediction of an event, and more specifically, predicting a subject exiting, or getting out of, a bed or a chair. The example implementations are directed to early prediction and risk assessment, followed by timely action. The approaches described here in combine action forecasting, electronic health records and individual fall risk profile.

Figure 2:
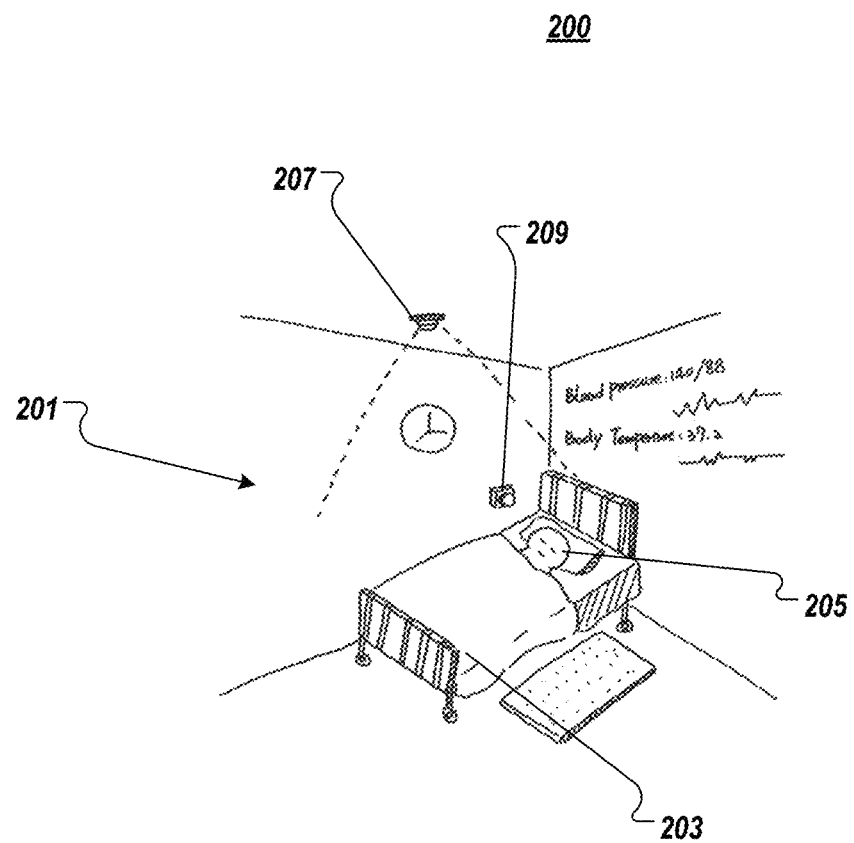
FIG. 2 illustrates various aspects of a subject and a room according to example implementations.

FIG. 2 illustrates the proposed system 200 according to the example implementations. In an environment 201, an object 203, such as a bed or chair is provided. A subject 205, is in a resting position on the object 203. Further, a motion sensor 207 and a camera sensor 209 are provided. The motion sensor 207 may include, but is not limited to a type of motion sensor that is passive infrared microwave, or ultrasound, or a combination thereof. The camera sensor 209 may be selected from one or more types, including but not limited to grayscale, RGB (red green blue), night vision, depth and/or thermal. The motion sensor 207 and the camera sensor 209, may be placed in a combined location, such as on a ceiling or a wall of a room, or may be placed in separate locations, and may be positioned or selected to provide the necessary information in a privacy protecting manner, such as use of depth camera or motion sensor, for example. Other privacy preserving approaches may be provided, including but not limited to use of a motion sensor instead of a camera, anonymization of information sensed or collected with respect to the subject, the environment, or the like.

According to the example implementations, and more specifically, by incorporating the data received from the one or more sensors with the electronic data such as hospital information, into an automatic learning system, deep neural networks provide vision based action forecasting, to predict a likelihood P of the subject exiting a safe position. Further, intrinsic, individual and contextual features are fused, to estimate a risk R of falling.

For example, the likelihood $P_t$ of a subject exiting the same position, and a fall risk $R_t$ associated with the subject falling at time t may be calculated. For example, but not by way of limitation if the subject is lying in a bed, $P_t$ represents a likelihood of a subject exiting the bed, and $R_t$ represents a continuous risk profiling as to a risk that the subject will fall. When $R_t$ is high, such as above a prescribed threshold, the subject or others charged with taking care of the subject should be provided with a high recall, so as to be able to advance to assist high risk subjects. On the other hand, when $R_t$ is low, due to increased precision associated with the example implementations, false alarms may be avoided.

Additionally, P and R are combined to determine a severity of a fall prevention intervention strategy to be applied. For example, a signal may be generated and emitted based on a level of severity according to the following rule base:

If P is low and R is low, do not signal
If P is low and R is high, signal the subject to suggest request for assistance
If P is high and R is low, signal the subject to follow a safety procedure
If P is high and R is high, signal the subject to remain in a safe position. and also signal staff directly for immediate assistance.

Figure 3:
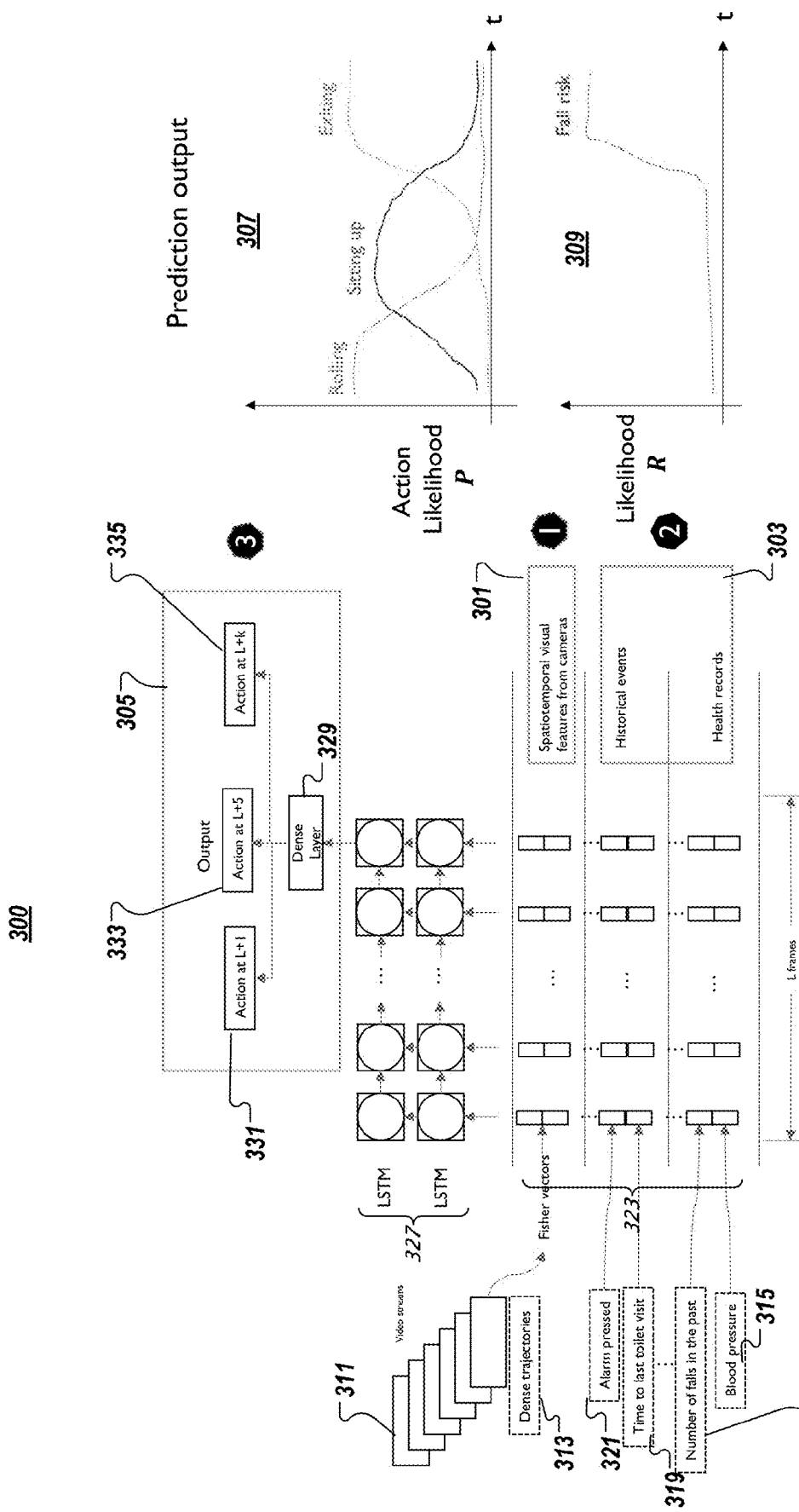
FIG. 3 illustrates various aspects of the system according to some example implementations.

FIG. 3 illustrates a system overview according to an example implementation. As shown in the system overview 300, a plurality of inputs are provided from the camera and/or motion sensors discussed above.

More specifically, as shown at 301, spatio-temporal visual features are provided from sensors such as cameras. For example, but not by way of limitation, the inputs from the sensors at 301 may include, but are not limited to video streams 311, for which spatio-temporal visual features 313 are generated, such as dense trajectories, but not limited thereto. The cameras sense not only the subject, or even the bed, but the entire environment in which the subject is located, including but not limited to the ambient environment of the room itself.

As shown at 303, information may be provided from electronic records, such as historical events and health records. For example, but not by way of limitation, the historical events include, but are not limited to, a time of a last event, such as toilet visit, at 319, a subject action, such as an alarm being pressed at 321, or the like. Health records may include, but are not limited to, information associated with subject vital signs, such as blood pressure at 315, and information associated with past relevant events, such as numbers of previous falls at 317.

The sensed information from 301 and the electronic records information from 303 are provided as inputs at 323 to the recurrent neural network (RNN). More specifically, the present example implementation may include a long short-term memory (LSTM) RNN or deep convolutional neural network (CNN), including a plurality of frames 325. In this example implementation an approach having two layers at 327 is provided.

Table 1 shows examples of sensed information 301 and electronic records information 303 that may be input into the example implementations. The risk factors are divided into three main categories: person specific, environmental and behavior routines. Person specific risk factors include information that is associated with the subject, such as vital signs, fall history, medical information, physical information or demographic information. Environmental fall risk factors include information associated with ambient surroundings, such as location, units such as room type, presence of roommates, light intensity and temperature, and time information. Behavior risk factors include information associated with behavior routines, such as requesting of assistant, toileting (e.g., continuous activity), sleep pattern information (e.g., categorical activity) and medical process. Moreover, the risk factor variables may be characterized as continuous or discrete variables.

In addition to having the information collected for the current medical incident, information may be collected in advance, such as based on prior medical incidents, or other activity occurring at home or in a hospital, for example. According to some example implementations, the same sensor may be provided in the home and in the hospital, and information that is received at each setting may be calibrated for the local environment.

TABLE 1

| | | Fall Risk Factors |
|---|---|---|
| Person specific | vital signs | $x_1$: continuous scale of deviations in blood pressure |
| | fall history | $x_2$: number of falls in the past |
| | medical | $x_3$: severity levels of diagnosed neurological disorders (i.e., Parkinson, Parkinsonian disorder), Diabetes, Depression or Incontinence |
| | physical | $x_4$: BMI |
| | | $x_5$: severity levels of impaired mobility |
| | | $x_6$: severity levels of impaired visual |
| | demographic | $x_7$: log(age - 65) |
| | | $x_8$: 1 if female gender |
| Environmental | location | $x_9$: normalized distance to the nursing station |
| | units | $x_{10}$: categorical type [1-medical-surgical units; 2-intensive care patients] |
| | | $x_{11}$: number if presence of roommates |
| | | $x_{12}$: light intensity |
| | | $x_{13}$: temperature |
| | time | $x_{14}$: 1 if night shift |
| | | $x_{15}$: number of days in the hospital |
| | | $x_{16}$: number of days after major surgery (i.e., knee replacement) |

TABLE 1-continued

Fall Risk Factors

| Behavior routines | assistant request toileting sleep medical process | $x_{17}$: normalized frequency bed alarm pressed<br>$x_{18}$: time to last toilet visit<br>$x_{19}$: deviations of sleep patterns<br>$x_{20}$: number of in-taking medications intake >4<br>$x_{21}$: nurse staffing [1-low; 2-medium; 3-high] |
|---|---|---|

The risk factors described in Table 1 are only examples, and other risk factors may be included or substituted for these risk factors, as would be understood by those skilled in the art. As noted above, related art approaches do not consider environmental risk factors.

In addition to a measurement of the current state of the foregoing risk factors, additional example implementations may include longitudinal measurement. For example, a risk assessment may be taken over time for a subject, and environment and/or behavior routines. The change in the risk assessment over time may be used to predict future changes in the risk assessment. In one example implementation, risk factors, such as those shown in Table 1, may be taken for a subject in time intervals, such as on a yearly basis, every five years, etc. The results may be analyzed in a longitudinal manner, to provide a forecast of future risk.

Further, in addition to changes in the risk factors that may be specific to the person, risk factors may also change with respect to the environment. For example, but not by way of limitation, different rooms within a hospital may have different risk factors for the same subject and the same behavior routines, or different hospitals may have different risk assessments for the same subject and the same behavior routines, in the same department of the hospital. These changes may be due to resource allocation, staffing, allocation of rooms, layout of hospital, etc. Such factors may be incorporated into the determination of the risk factors, as explained herein.

An output 305 of the LSTM RNN includes a dense layer 329; the LSTM layers are combined with the dense layer to predict a likelihood of the event, such as getting out of bed at various time (e.g., timestamps). In the present illustrative example implementation, timestamps of 1, 5, and k are represented at 331, 333 and 335, respectively.

The outputs illustrated at 305 providing the predicted likelihood of getting out of bed are combined to estimate a current fall risk. Optionally, an attention—based LSTM may be used. More specifically, this approach may learn the importance of features during temporal relationship mining. Alternatively, other example implementations or alternatives may also be used, using alternative sequence models, such as gated recurrent units (GRU) and temporal convolution nets (TCN).

Figure 4:
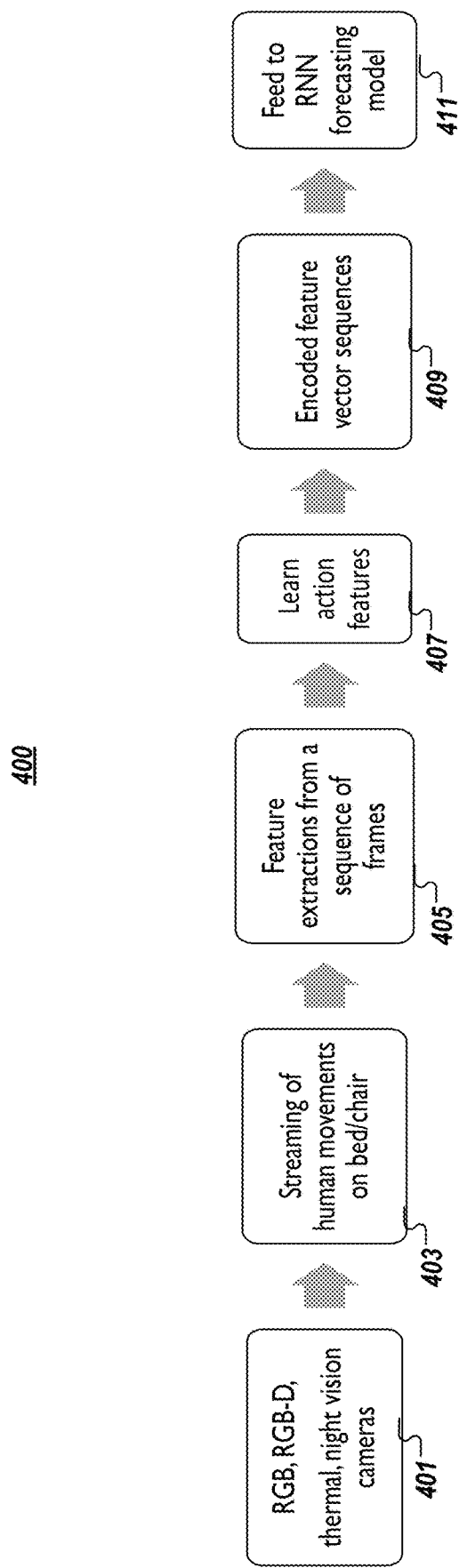
FIG. 4 illustrates a workflow associated with a visual system or predicting an action or an event according to some example implementations.

FIG. 4 illustrates a workflow according to the example implementations. More specifically, a workflow 400 associated with video monitoring components for action forecasting is provided. The output is a continuous scale $P \in [0,1]$ associated with a likelihood of a subject moving out of a safe position, such as a subject getting out of bed, at a current time.

At 401, sensing devices, such as camera sensors, are provided to sense the environment. For example, and as discussed above, cameras may be employed, including but not limited RGB, RGB-D, thermal and night vision cameras. For example, but not by way of limitation, a depth camera or a thermal camera may be used to segment the subject in the foreground. At 403, movement of the subject on the bed or chair is streamed, as well as the human movements that may occur in the environment surrounding the bed, such as the room in which the subject is located.

At 405, a feature extraction operation is performed, such that features are extracted from a sequence of frames. For example, a two stream convolutional neural network (CNN) architecture may be employed to stack images and optical flow sequences, to represent frame level features. The spatial data from the image sequences includes appearance information, and the temporal data from the optical flow is associated with motion information. Alternatively, features such as skeleton joints may be used as feature representations.

According to the example implementations, a window of consecutive frames may be processed to extract features representative of the spatial temporal dynamics of movement patterns. For example, but not by way of limitation, such movement patterns may include a subject rolling in bed, and movements associated with a subject sitting up or lying down. According to one example implementation, densely sampled local spatio-temporal features known as dense trajectories may be used to represent action dynamics. Such dense sampling of local features may outperform sparse spatio—temporal interest points.

Accordingly, the example implementations are directed to use of dense sampling approaches and extracted local features along the dense trajectories. Accordingly, features that are highly relevant to human actions may be encoded, without a requirement for background segmentation. Approaches that may be used in the example implementations that may be used in the example implementations include, but are not limited to, histogram of oriented gradients (HOG), histogram of optical flow (HOF) and motion boundary histogram (MBH). However, other approaches may be substituted for these approaches, as would be understood by those skilled in the art.

At 407, action features are learned. For example, video training data of subjects moving in beds, sitting on chairs and walking may be used such that the system learns codebooks for feature encoding.

At 409, feature vector sequences are encoded. Encoding the feature descriptors may include a combination of different feature types or use of a subset of the features. During training, action features are clustered, for example using Gaussian mixture models (GMMs). During testing, features extracted from a window of consecutive frame may be encoded as Fisher Vectors that can learn the distributions of descriptors, and may thus be less sensitive with the occurrence frequency of each word, as well as the encoding additional information associated with a distance of each descriptor from the center. According to an alternate example implementation, the features may be represented using bag of visual words (BOV) soft BOV, or hashing.

At 411, the information is fed to the forecasting model, such as an RNN forecasting model. Further details of the forecasting model are discussed in greater detail below.

Figure 5:
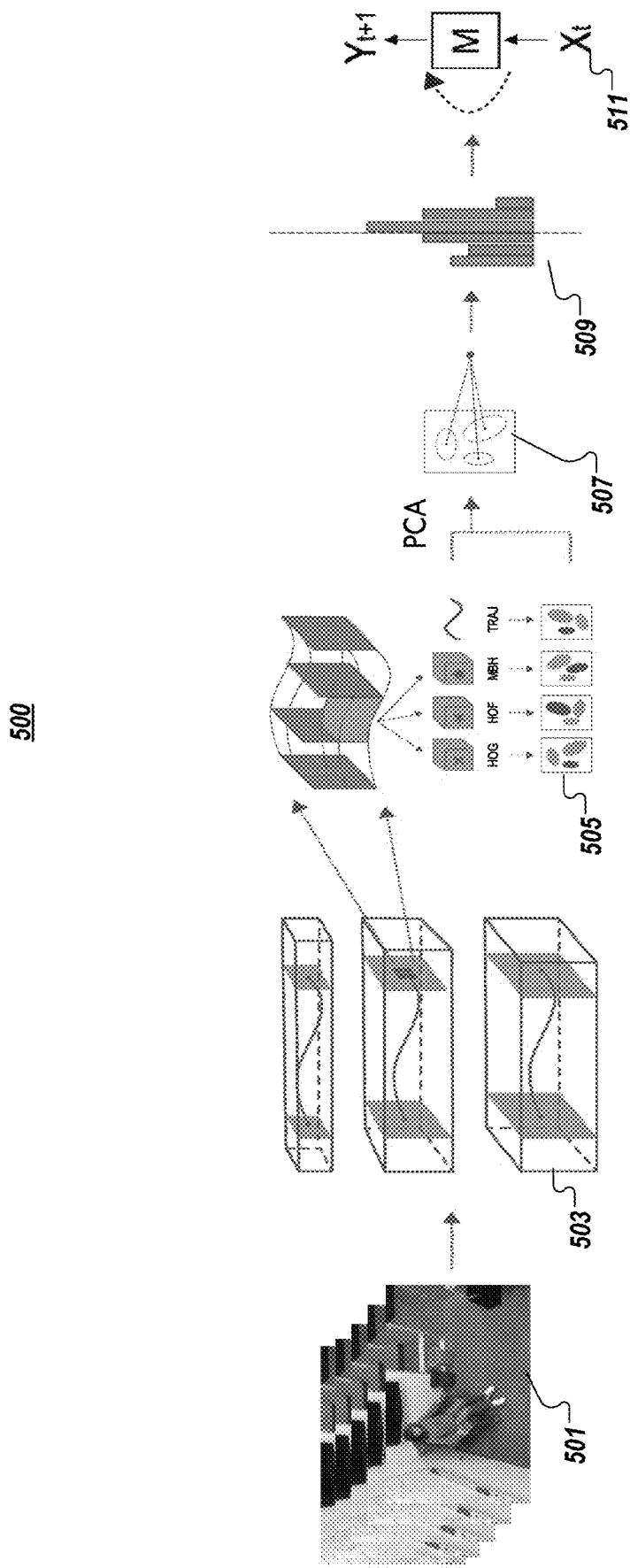
FIG. 5 illustrates a pictorial illustration of a workflow associated with a visual system or predicting an action or an event according to some example implementations.

FIG. 5 provides a pictorial visualization 500 of the workflow of the video monitoring for action forecasting according to the example implementations. A goal of forecasting the human actions with respect to a potential event or action is to predict the action in time, given a continuous video stream. The video stream may include multiple sequential actions, such as routine activities that contain multiple actions that may have subtle differences from one another, and follow a prescribed sequence. For example, but not by way of limitation, the difference between a sleep pattern of a subject in normal sleep and a subject in abnormal sleep having a higher fall risk may only have subtle differences in terms of the subject movement, relative to the overall movement during a sleep event.

The present example implementations use dense trajectories to extract local spatial—temporal patterns, instead of frame level representations. A Gaussian Mixture Model (GMM) is used to build a code book for the descriptors of the dense trajectories in each of the feature categories (e.g., trajectory, HOG, HOF and MBH). A short sequence of the video is represented using Fisher vectors from the trained codebook, followed by a combination of short range action feature representations with high-level temporal models, such as TCN and LSTM, to learn long-range action dependencies. In the case of the TCN model, a temporal convolutional network consists of repeated blocks of convolutions, followed by nonlinear activations.

In the case of an LSTM model, the sequential information of the input data is used, and current sub sequences are processed, given information extracted from previous sub sequences with the use of memory cells. Thus, LSTM can learn both short-term and long-term dependency patterns from input features. The present example implementation may include a bidirectional LSTM that comprises two reversed unidirectional LSTMs. The memory units may be followed by a time distributed, dense layer, the results of which may be fed into an output softmax layer for prediction.

For example, at 501, use of a depth camera or thermal cameras to segment a foreground human subject, and provide streaming of human movements on a bed or chair is illustrated. At 503, generation of dense trajectories for use in feature extraction is disclosed. Further, at 505, the various dense sampling approaches are disclosed, which result in learning of action features, such as using GMM training action codebooks at 507. At 509, encoding of extracted features as Fisher vectors is disclosed, and at 511, an output action likelihood is disclosed.

Figure 6A:
FIGS. 6(a)-6(c) illustrate dense sampling of local features according to some example implementations.
Figure 6B:
Figure 6C:

FIGS. 6(a)-6(c) illustrates an example implementation that employs a dense trajectory approach. As shown in FIG. 6(a), a person is in a sitting position, and interest points are sampled at a greater density around the sitting person. As can be seen in FIG. 6(b) at 603, the sampled interest points can show movement as a different color, texture or shape of the points; because of the greater density of sampling around the sitting person, more granularity is provided for the movement. Further, as shown in FIG. 6(c) at 605, the densely sampled points of interest show movement of the person out of the chair and walking away.

Figure 7:
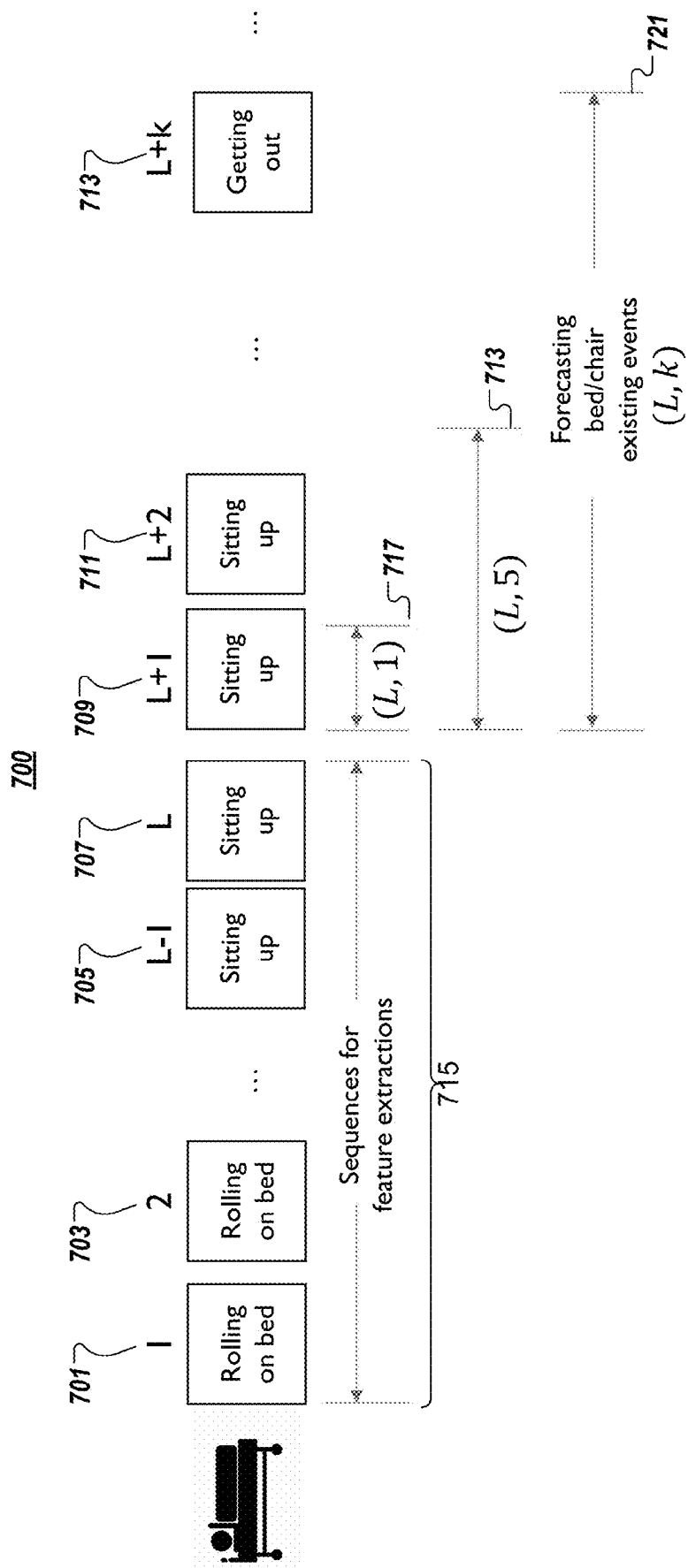
FIG. 7 illustrates extraction of prediction instances according to some example implementations.

FIG. 7 illustrates model learning and collection of training instances for predicting an action likelihood according to an example implementation, at 700. Training instances of action forecasting are set up as (L, k) timestamps for action classification tasks. At 701, 703, 705 and 707, for example, sensed information, such as rolling on a bed or sitting up, are shown as frames. Further, classifiers may classify, based on training data, whether sleep is normal, such as may be found in sleep patterns or historical information associated with sleep patterns for the subject or other similar subjects in similar situations, or on the other hand, is not considered to be normal sleep activity, which may be indicative of a risk of falling.

This information represents sequences 715, for feature extractions. Elements 709, 711 and 713 represent upcoming actions or events, at future timestamps, such as sitting up, getting out, etc. The tasks may predict an event or action, such as whether a subject will move from a safe position in a bed or a chair, in the upcoming k timestamps, based on the learned long-term pattern, as well as recent observations made during the prior L frames.

The input to the predictive models is a time series of encoded feature vectors, as explained above, and more particularly as provided at 411 of FIG. 4. The neural network approach includes use of LSTM, a variant of RNNs, the model long-term dependencies, and to provide predictions based on the input. As shown above in FIG. 3 at 327, one example implementation includes two LSTM layers that are combined with one dense layer, to predict a likelihood of a subject moving from a safe position in the bed, at the subsequent 1, 5 and n timestamps, shown as 717, 719 and 721, respectively; the outputs of these predictions are combined, to provide an estimate of a current fall risk.

As an alternate example implementation, attention—based LSTM may be used, to learn the importance of features during temporal relationship mining. Other example implementations may use other sequence models, including but not limited to gated current units (GRU) and temporal convolution nets (TCN).

More specifically, for consecutive M frames from a video subsequence $S=\{f_t\}_{t=1}^{M}$, X represents the visual feature representations that are input to a prediction model. Given the input $X_t$ for time step T, the likelihood of action is predicted at $P_t$. According to an example implementation, if the softmax activation function is used in the output layer of a deep neural network, the output likelihood of action $P_t$ may be obtained by taking the probabilities of the current input $X_t$ that belongs to an existing action.

Accordingly, the present example implementations provide use of dense trajectories to extract local atomic action patterns from image streams of a moving human body, as well as Fisher vectors to encode features and neural networks to predict events and activity associated with the subject in the bed or chair, or fall prevention.

In addition to the foregoing prediction information associated with the predictive models, the example implementations also include dynamic risk profiling specific to a subject, for each timestamp. These example implementations may provide a high recall or high risk subjects.

As noted above, Table 1 discloses risk factors associated with a fall. Some factors may be provided based on existing medical research and hospital reports. Further, a subject may have different combinations of risk factors associated with a fall, and the fall risks may change over time, including during the subject's stay in the hospital. Further, the risk may vary across different medical units, and may also vary across hospitals.

For example, intrinsic subject features, such as age over 65 years, impaired gait, visual impairment, or a low biomass index (BMI) may be more likely to lead to falls. Additionally, the risk of a fall may be greater for a subject having a history of falls and neurological disorders. Characteristics of the subject room may also impact the risk of subject fall and injury. For example, surgical subjects may have a higher risk than intensive care subjects, and subjects in single rooms may have a greater fall risk, due to staffing limitations. Further, time of day may also be an important factor, as injury may be more frequent during a night shift, and older subjects may be more likely to fall on the first day after moving to a new room.

Behavior routines may also impact risk of fall. For example, but not by way of limitation, a subject who has used a call button multiple times to indicate a need to move from the safe position in a bed, such as to go to the bathroom, may have a higher probability or likelihood of moving out of the bed, while other subjects may press the call button without an actual need to move out of the bed. Individual subject vital assessments that may affect fall risk after a subject leaves the bed may include blood pressure, medication or recent injuries. For example, a decrease in blood pressure may indicate orthostatic hypertension, which is associated with a higher fall risk, and taking more than four medications may increase the fall risk.

Example implementations provide a profile of a risk of falling based on the input, including those included in Table 1, and the calculation of risk probability. In other words, risk factors may be provided based on medical research, hospital reports or the like, and data may be provided by sensors, such that the values of each of the fall risk factors that are obtained include vital signs, electronic health record collection or the like, are collected and encoded, as either continuous or categorical features. For example, but not by way of limitation, vital signs may be sensed automatically or collected by hospital staff.

According to one example implementation, if a data set is available from a hospital, a regression method may be applied to learn a feature weight b, and to estimate a fall risk $R \in [0,1]$. Alternatively, hospital staff may provide a manual indication of an importance of variables collected by sensors. As noted above, the sensors not only look at the immediate location of the subject at the bed, but the overall environment, and thus are configured to sense additional information that may be used as risk factors. Input risk variables may be encoded as either continuous or categorical features as explained above, and a normalization (e.g., scaling the risk score between zero and 1, in a manner that permits standardization and comparison across medical incidents, subjects, etc.) may be applied on each feature dimension. For the list of N risk factors $x_i$, such as those shown in Table 1, for $i \in [1,N]$, a fall risk $R_t$ is calculated at time t for each subject, as a logistic regression of input risk factors, as shown in equations (1) and (2) as follows:

$$\text{Patient's fall risk score } S_t = b_0 + b_{lowbloodpressure} x_1 + b_{Hfalls} x_2 + \ldots b_N x_N \quad (1)$$

$$\text{Patient's fall risk } R_t = 1/(1+\exp^{-s_t}) \quad (2)$$

Based on the foregoing likelihood of moving out of the safe position P, combined with a risk of falling R, fall prevention signaling strategies may be adapted. Table 2 provides an example of fall prevention protocols depending on values of P and R, according to the example implementations.

TABLE 2

Fall Prevention Protocols

| | High fall risk R | Low fall risk R |
|---|---|---|
| High exiting likelihood P | notify staff; warn patients; lower bed height; check bedrails are up | reminders of safety existing procedure |
| Low exiting likelihood P | reminders of requesting assistance | |

For example, a rule-based approach may be implemented as follows. If P is below a threshold and R is below a threshold, a signal may not be provided, as the probability of moving from the safe position as well as the risk of falling are below thresholds.

In another scenario, if P is below the threshold and R is above the threshold, a signal may be provided to the subject, recommending that the subject request assistance. This situation would be indicative of a high fall risk, but the subject not being in a high probability of moving out of the safe position.

Additionally, if P is above a threshold and R is below a threshold, the subject may be provided with a single to follow a safety procedure. This condition may be associated with a high probability of the subject moving from the safe position, but a low risk of falling for that subject.

Further, if P is above a threshold and R is also above a threshold, a signal may be provided to the subject to remain in the safe position, and also, a signal may be provided to staff, to directly provide immediate assistance.

The foregoing scenarios are merely examples, and are not intended to be limiting. Other examples may also be implemented, with variations as would be understood by those skilled in the art. For example, the signals emitted in the case of a certain scenario may vary, depending on the local hospital protocol, subject preference, or other basis. Further, threshold for P and R may vary. Further, protocols may not be limited to reminders and staff notifications, but may be integrated into other aspects of subject movement, such as rehabilitation, physical therapy or the like.

Figure 8:
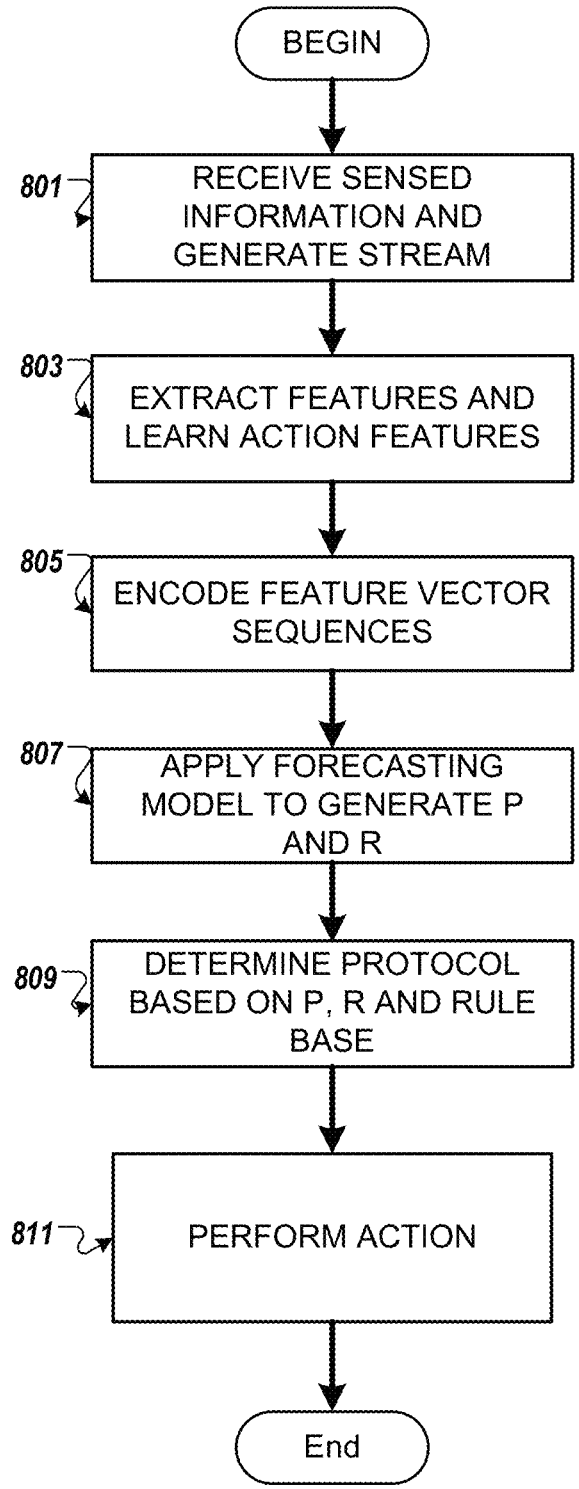
FIG. 8 illustrates an example process for some example implementations.

FIG. 8 illustrates an example process 800 according to the example implementations. The example process 800 may be performed on one or more devices, as explained herein.

At 801, information is sensed, such as by a camera or motion sensor as explained above. Further, sensed information is received, and a stream is generated. The stream is indicative of the movement of an object on a surface, such as a subject on a bed or a chair or floor. Structures and techniques associated with the sensing of the information and the generation of the stream are described above with respect to the example implementations.

At 803, extraction of features from a sequence of frames is performed, and action features are learned. For example, but not by way of limitation, the use of approaches such as dense trajectories may be employed, along with additional techniques and implementations as described above.

At 805, feature vector sequences are encoded, such as based on GMM training action codebooks, to encode a window of consecutive frames as Fisher vectors, for example. The encoded feature vector sequences are fed into the forecasting model, which is described above respect to FIG. 3.

At 807, the values of P and R, associated with the probability or likelihood of a subject getting out of a bed or chair, and a risk of fall are calculated. The calculation of P and R is based on the predictive model and risk profiling approaches as described above.

At 809, the values of P and R are assessed to determine whether they are relatively high or low. For example, the values of P and/or R may be compared to a threshold. Based on the assessment, a rule-based may be applied, and one or more protocols may be selected, such as those shown in Table 2 above.

At 811, an action is performed based on the selected protocol. For example, but not by way of limitation the action may include providing a signal to the subject, providing a signal to an external resource such as a third party such as a caretaker or staff, or executing an action to be automatically performed with respect to a device associated with the user, such as switching a position of a bed or protective equipment, placing fall mitigation equipment or padding in place, activating an alarm, unlocking the door to the room, or other activity as may be understood to be an action associated with implementing the protocol based on values of P and R, indicative of a prediction of a subject exiting a safe position in a bed or chair, combined with a risk of falling, such as noted in equations (1) and (2) above.

With respect to the actions that may be taken, in addition to the foregoing examples, additional non-limiting examples may be employed. For example, but not by way of limitation, the action may not be limited to the signal provided to the subject, or a third party such as a caretaker or staff to implement immediate action to prevent the fall. Additional actions may include providing aggregated risk profiles for plural subjects, such as in a hospital department, a hospital floor, or the entire hospital, in a privacy preserving manner, and based on the aggregated risk profiles, re-allocating resources within a hospital, department or other organizational entity. According to one example implementation, if a fall risk is substantially higher at a certain time of day or night, additional resources may be allocated, or subjects may be moved, to address those risk factors.

Further nonlimiting examples of actions that may be performed based on a selected protocol may include, but are not limited to, sending a third party to intervene and prevent the fall, activating lights, such as for floor guidance, or a sign for the subject, and providing warnings or recommendations by way of a speaker in the room or on a mobile device of the subject; the information provided may be prerecorded messages, light signals, audio messages or other communications as would be understood by those skilled in the art.

As also explained above, the actions may involve controlling devices, so as to reduce the risk associated with a fall by the subject. For example, as explained above, features associated with a bed, such as an automated or motorized rail or other guard, for padding on the floor, or other support structures, may guide the subject to get out of the bed in a manner that reduces the risk of a fall, or even increase the difficulty of inadvertently getting out of the bed, such as by changing a position, angle, orientation of the bed, moving the bed itself, or moving other objects within the room.

In some example implementations, the system may interface with a sensing or detection system, or by way of the sensors or cameras described herein, determine whether a subject has inadvertently not placed a protective feature of the bed in its proper position. For example, a rail detection system to detect when a rail is not in the engaged position while a subject is sleeping, possibly do to a subject inadvertently not placing the guard in the appropriate position.

In the foregoing example implementation, the operations are performed at an online mobile application associated with a user. For example, a client device may include a camera sensor, or communicate directly with the sensor in the room, and some or all of the processing may be performed locally on the online mobile application. However, the example implementations are not limited thereto, and other approaches may be substituted therefor without departing from the inventive scope. For example, but not by way of limitation, other example approaches may perform the operations remotely from the client device (e.g., at a server).

Figure 9:
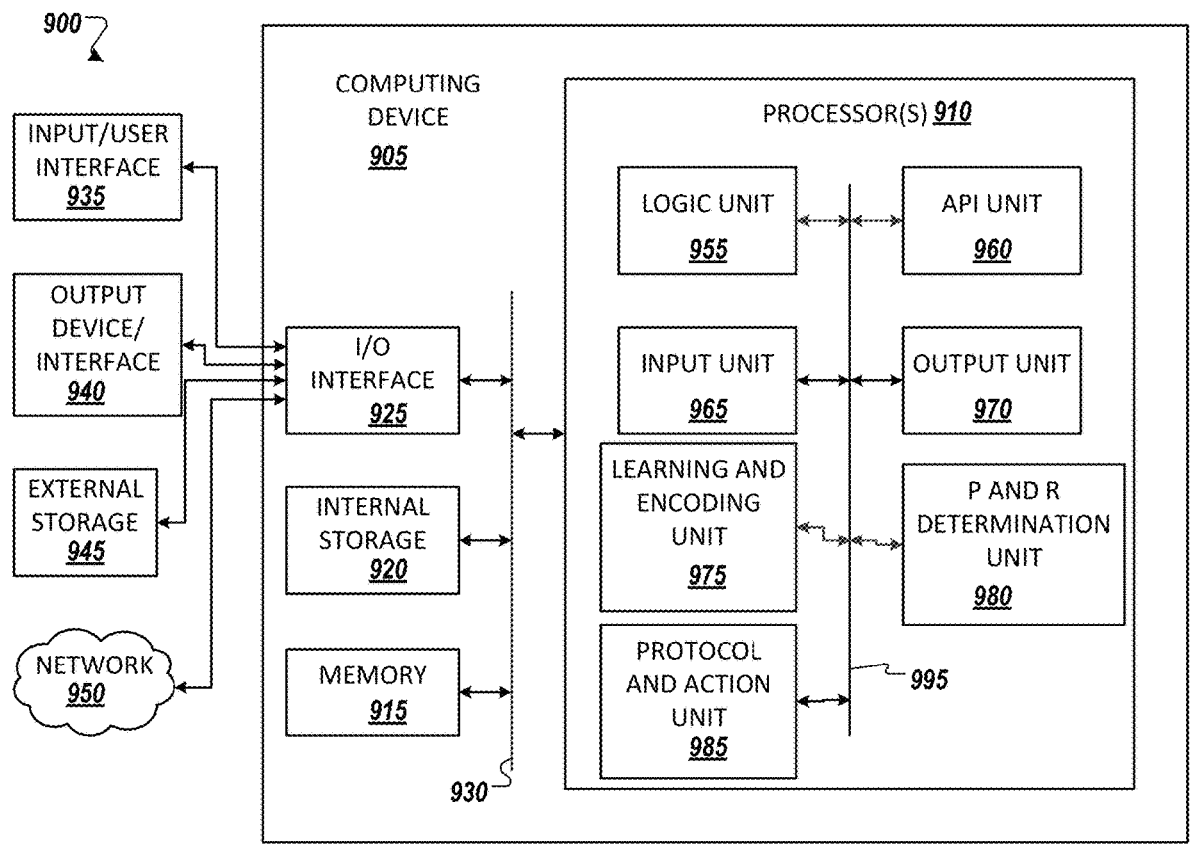
FIG. 9 illustrates an example computing environment with an example computer device suitable for use in some example implementations.

FIG. 9 illustrates an example computing environment 900 with an example computer device 905 suitable for use in some example implementations. Computing device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computing device 905.

Computing device 905 can be communicatively coupled to input/interface 935 and output device/interface 940. Either one or both of input/interface 935 and output device/interface 940 can be a wired or wireless interface and can be detachable. Input/interface 935 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 940 may include a display, television, monitor, printer, speaker, braille, or the like. In some example implementations, input/interface 935 (e.g., user interface) and output device/interface 940 can be embedded with, or physically coupled to, the computing device 905. In other example implementations, other computing devices may function as, or provide the functions of, an input/interface 935 and output device/interface 940 for a computing device 905.

Examples of computing device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 905 can be communicatively coupled (e.g., via I/O interface 925) to external storage 945 and network 950 for communicating with any number of networked components, devices, and systems, including one or more computing devices of the same or different configuration. Computing device 905 or any connected computing device can be functioning as, providing services of, or referred to as, a server, client, thin server, general machine, special-purpose machine, or another label. For example but not by way of limitation, network 950 may include the blockchain network, and/or the cloud.

I/O interface 925 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computing device 905 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 910 can execute under any operating system (OS) (not shown), in a native or virtual environment. One or more applications can be deployed that include logic unit 955, application programming interface (API) unit 960, input unit 965, output unit 970, learning and encoding unit 975, P and R determination unit 980, protocol and action unit 985, and inter-unit communication mechanism 995 for the different units to communicate with each other, with the OS, and with other applications (not shown).

For example, the learning and encoding unit 975, the P and R determination unit 980, and the protocol and action unit 985 may implement one or more processes shown above with respect to the structures described above. The described units and elements can be varied in design, function, configuration, or implementation and are not limited to the descriptions provided.

In some example implementations, when information or an execution instruction is received by API unit 960, it may be communicated to one or more other units (e.g., logic unit 955, input unit 965, learning and encoding unit 975, P and R determination unit 980, and protocol and action unit 985).

For example, the learning and encoding unit 975 may receive and process information, from one or more sensors, perform feature extraction, learn action features, and the like, as explained above. An output of the learning and encoding unit 975 is provided to the P and R determination unit 980, which performs the necessary forecasting based on the application of the neural networks as described above and illustrated in FIG. 2, for example, and also determines R to provide a risk of falling for a subject in an environment, as also explained above. Additionally, the protocol and action unit 985 may provide a signal associated with an action, based on the output of the learning and encoding unit 975 and the P and R determination unit 980.

In some instances, the logic unit 955 may be configured to control the information flow among the units and direct the services provided by API unit 960, input unit 965, learning and encoding unit 975, P and R determination unit 980, and protocol and action unit 985 in some example implementations described above. For example, the flow of one or more processes or implementations may be controlled by logic unit 955 alone or in conjunction with API unit 960.

Figure 10:
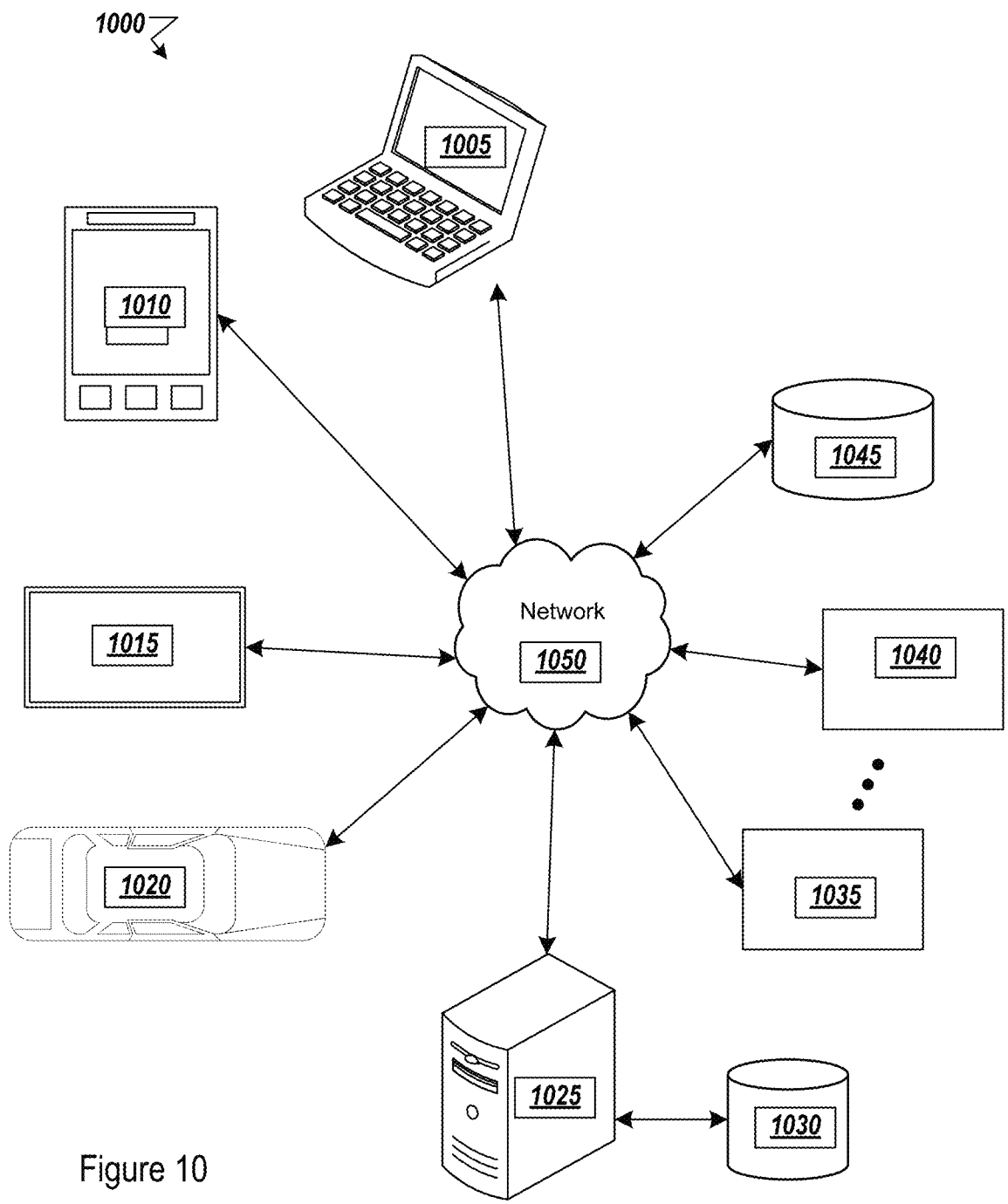
FIG. 10 shows an example environment suitable for some example implementations.

FIG. 10 shows an example environment suitable for some example implementations. Environment 1000 includes devices 1005-1045, and each is communicatively connected to at least one other device via, for example, network 1060 (e.g., by wired and/or wireless connections). Some devices may be communicatively connected to one or more storage devices 1030 and 1045.

An example of one or more devices 1005-1045 may be computing devices 905 described in FIG. 9, respectively. Devices 1005-1045 may include, but are not limited to, a computer 1005 (e.g., a laptop computing device) having a monitor and an associated webcam as explained above, a mobile device 1010 (e.g., smartphone or tablet), a television 1015, a device associated with a vehicle 1020, a server computer 1025, computing devices 1035-1040, storage devices 1030 and 1045.

In some implementations, devices 1005-1020 may be considered user devices associated with the users, who may be remotely obtaining a sensed input used a inputs for the forecasting model and/or risk profiling. In the present example implementations, one or more of these user devices may be associated with one or more cameras, that can sense information as needed for the predictive modeling and the risk profiling, as explained above.

Aspects of the example implementations may have various advantages and benefits. For example, but not by way of limitation, the present example implementations provide predictive approaches and activity analysis. Additionally, the present example implementations take a passive approach, using sensors in the surroundings of the subject. Further, the present example implementations may distinguish falls from other daily activities, such as standing, sitting, lying down, walking, and ascending or descending stairs.

Additionally, the example implementations herein are directed to a camera having death and motion sensors, and is capable of using grayscale input, without requiring RGB. Further, the example implementations are not only directed to human movement in the bed, but in any safe position.

Thus, the example implementations may provide prediction and risk profiling that permits high recall for high risk subjects, in accordance with a rule-based protocol approach. While these example implementations are primarily directed to a subject in a hospital setting, other examples may be considered. For example, but not by way of limitation, the foregoing example implementations may be applied in a non-hospital setting, such as in a residence of the subject, to address conditions such as sleepwalking or other abnormal movement in sleep. Further, the example implementation may be incorporated with other types of sensors that may predict and assess risk with respect to other types of conditions, such as sleep apnea, sudden infant syndrome (SIDS), or other conditions. In a manner similar to that explained above, with respect to control of a hospital bed, the example implementations may control other medical devices, such as intravenous feed, oxygen supply, breathing support, etc.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

What is claimed is:
1. A computer-implemented method, comprising:
  based on information of a subject positioned on an object in an environment, generating a data stream;
  for the data stream, extracting features associated with a movement of the subject with respect to the object or the environment, wherein the movement is represented by spatio-temporal features extracted from sensors;

generating a prediction associated with a likelihood of the movement based on the extracted features, and a risk profile of the movement based on a plurality of fall risk factors; and applying the prediction and the risk profile to a rule base to perform an action, wherein the rule base comprises determining whether the prediction exceeds a first threshold and whether the risk profile exceeds a second threshold, and based on the determining, performing the action.

2. The computer-implemented method of claim 1, wherein the information is sensed by at least one of a camera sensor and a motion sensor.

3. The computer-implemented method of claim 2, wherein the camera sensor comprises a depth sensor or a thermal sensor.

4. The computer-implemented method of claim 1, wherein the extracting the features comprises applying the dense trajectories to extract the features or Convolutional Neural Networks (CNN) to learn the spatio-temporal features from a sequence of frames in the data stream, applying an automatic learning system to learn the features, and encoding sequences of feature vectors based on the learned features and the extracted features.

5. The computer-implemented method of claim 1, wherein the generating the prediction comprises providing, over a time horizon, the extracted features to a recurrent neural network or a convolutional neural network to generate an output that is provided to the dense layer, an output of which is fed to a softmax layer to generate the prediction.

6. The computer-implemented method of claim 1, wherein the risk profile is generated by receiving the plurality of fall risk factors that comprise factors specific to the subject, factors specific to an environment associated with the subject, and factors associated with behavioral routines associated with the environment and the subject, over time.

7. The computer-implemented method of claim 1, wherein the action comprises one or more of generating a signal for the subject, controlling a state of the object, and providing a command to an external resource to perform the action.

8. The computer-implemented method of claim 1, wherein the subject is a person, the object is a bed or a chair, and the movement is the person falling from the bed or the chair.

9. A non-transitory computer readable medium having a storage that stores instructions, the instructions executed by a processor, the instructions comprising:

based on information of a subject positioned on an object in an environment, generating a data stream;

for the data stream, extracting features associated with a movement of the subject with respect to the object or the environment, wherein the movement is represented by spatio-temporal visual features;

generating a prediction associated with a likelihood of the movement based on the extracted features, and a risk profile of the movement based on a plurality of fall risk factors; and applying the prediction and the risk profile to a rule base to perform an action, wherein the rule base comprises determining whether the prediction exceeds a first threshold and whether the risk profile exceeds a second threshold, and based on the determining, performing the action.

10. The non-transitory computer readable medium of claim 9, wherein the information is sensed by at least one of a camera sensor and/or a motion sensor, and the camera sensor comprises a depth sensor or a thermal sensor.

11. The non-transitory computer readable medium of claim 9, wherein the extracting the features comprises applying the dense trajectories or Convolutional Neural Networks (CNN) to learn the spatio-temporal features to extract the features from a sequence of frames in the data stream, applying an automatic learning system to learn the features, and encoding sequences of feature vectors based on the learned features and the extracted features.

12. The non-transitory computer readable medium of claim 9, wherein the generating the prediction comprises providing, over a time horizon, the extracted features to a recurrent neural network or a convolutional neural network to generate an output that is provided to the dense layer, an output of which is fed to a softmax layer to generate the prediction.

13. The non-transitory computer readable medium of claim 9, wherein the risk profile is generated by receiving the plurality of fall risk factors that comprise factors specific to the subject, factors specific to an environment associated with the subject, and factors associated with behavioral routines associated with the environment and the subject, over time.

14. The non-transitory computer readable medium of claim 9, wherein the action comprises one or more of generating a signal for the subject, controlling a state of the object, and providing a command to an external resource to perform the action.

15. The non-transitory computer readable medium of claim 9, wherein the subject is a person, the object is a bed or a chair, and the movement is the subject falling from the bed or the chair.

16. A processor capable of processing a request, the processor configured to perform the operations of:

based on information of a subject positioned on a bed or chair in an environment, generating a data stream;

for the data stream, extracting features associated with a fall of the subject with respect to the bed or chair, or the environment, wherein the fall is represented by spatio-temporal visual features;

generating a prediction associated with a likelihood of the fall based on the extracted features, and a risk profile of the fall based on a plurality of fall risk factors; and applying the prediction and the risk profile to a rule base to perform an action, wherein the rule base comprises determining whether the prediction exceeds a first threshold and whether the risk profile exceeds a second threshold, and based on the determining, performing the action.

17. The processor of claim 16, wherein the extracting the features comprises applying the dense trajectories to extract the features or Convolutional Neural Networks (CNN) to learn the spatio-temporal features from a sequence of frames in the data stream, applying an automatic learning system to learn the features, and encoding sequences of feature vectors based on the learned features and the extracted features, the generating the prediction comprises providing, over a time horizon, the extracted features to a recurrent neural network or a deep neural network to generate an output that is provided to the dense layer, an output of which is fed to a softmax layer to generate the prediction, and the risk profile is generated by receiving the plurality of fall risk factors that comprise factors specific to the subject, factors specific to an environment associated with the subject, and factors associated with behavioral routines associated with the environment and the subject, over time.

18. The processor of claim 16, wherein the action comprises one or more of generating a signal for the subject, controlling a state of the bed or chair, and providing a command to an external resource to perform the action.

\* \* \* \* \*